(12) United States Patent
Davidson

(10) Patent No.: US 9,020,761 B2
(45) Date of Patent: *Apr. 28, 2015

(54) CONCEPTS FOR DEFINING TRAVEL PATHS IN PARKING AREAS

(71) Applicant: Mark J. Davidson, Alpharetta, GA (US)

(72) Inventor: Mark J. Davidson, Alpharetta, GA (US)

(73) Assignee: United Parcel Service of America, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/249,518

(22) Filed: Apr. 10, 2014

(65) Prior Publication Data

US 2014/0278101 A1 Sep. 18, 2014

Related U.S. Application Data

(63) Continuation of application No. 13/795,258, filed on Mar. 12, 2013, now Pat. No. 8,731,832.

(51) Int. Cl.
*G01C 21/34* (2006.01)
*G01C 21/32* (2006.01)

(52) U.S. Cl.
CPC ............... *G01C 21/34* (2013.01); *G01C 21/32* (2013.01)

(58) Field of Classification Search
CPC .... G01C 21/34; G01C 21/32; G01C 21/3407; G08G 1/123; G08G 1/0112; G08G 1/0129
USPC .......... 701/533, 23, 400, 532; 318/443, 444; 188/79.54; 404/17; 340/932.2
See application file for complete search history.

(56) References Cited

U.S. PATENT DOCUMENTS

| | | | |
|---|---|---|---|
| 7,215,255 B2 | 5/2007 | Grush | |
| 8,063,797 B1 | 11/2011 | Sonnabend et al. | |
| 8,432,297 B2 | 4/2013 | Sonnabend et al. | |
| 8,655,593 B1 | 2/2014 | Davidson | |
| 8,692,739 B2 | 4/2014 | Mathieu et al. | |
| 8,704,653 B2 | 4/2014 | Seder et al. | |
| 8,731,832 B1 * | 5/2014 | Davidson | 701/533 |
| 2003/0046655 A1 | 3/2003 | Kimura | |
| 2004/0181495 A1 | 9/2004 | Grush | |
| 2007/0021907 A1 | 1/2007 | Kato et al. | |
| 2009/0148259 A1 | 6/2009 | Shani | |
| 2009/0157566 A1 | 6/2009 | Grush | |
| 2010/0253543 A1 | 10/2010 | Szczerba et al. | |
| 2012/0062395 A1 | 3/2012 | Sonnabend et al. | |
| 2012/0253548 A1 | 10/2012 | Davidson | |
| 2012/0253587 A1 | 10/2012 | Davidson | |
| 2012/0253632 A1 | 10/2012 | Davidson | |
| 2012/0253861 A1 | 10/2012 | Davidson et al. | |
| 2012/0253862 A1 | 10/2012 | Davidson | |

(Continued)

OTHER PUBLICATIONS

United States Patent and Trademark Office, Notice of Allowance and Fee(s) Due for U.S. Appl. No. 13/795,290, Nov. 14, 2013, 12 pages, USA.

(Continued)

*Primary Examiner* — McDieunel Marc
(74) *Attorney, Agent, or Firm* — Alston & Bird LLP

(57) ABSTRACT

Computer program products, methods, systems, apparatus, and computing entities are provided for defining travel paths in parking areas. In one embodiment, travel paths in parking areas can be defined by connecting street networking connection points within the parking areas. In another embodiment, such defined travel paths can be merged with actual paths traveled by vehicles in the parking areas.

18 Claims, 14 Drawing Sheets

(56) References Cited

U.S. PATENT DOCUMENTS

| | | |
|---|---|---|
| 2012/0253867 A1 | 10/2012 | Davidson |
| 2012/0253888 A1 | 10/2012 | Davidson |
| 2012/0253889 A1 | 10/2012 | Davidson et al. |
| 2012/0253892 A1 | 10/2012 | Davidson |
| 2013/0030873 A1 | 1/2013 | Davidson |
| 2013/0031029 A1 | 1/2013 | Davidson |
| 2013/0183924 A1 | 7/2013 | Saigh et al. |
| 2013/0282448 A1 | 10/2013 | Rydbeck et al. |
| 2013/0304349 A1 | 11/2013 | Davidson |
| 2014/0132767 A1 | 5/2014 | Sonnabend et al. |

OTHER PUBLICATIONS

United States Patent and Trademark Office, Notice of Allowance and Fee(s) Due for U.S. Appl. No. 13/795,258, Mar. 18, 2014, 14 pages, USA.

United States Patent and Trademark Office, Office Action for U.S. Appl. No. 14/150,033, Oct. 9, 2014, 20 pages, USA.

* cited by examiner

Fig. 6

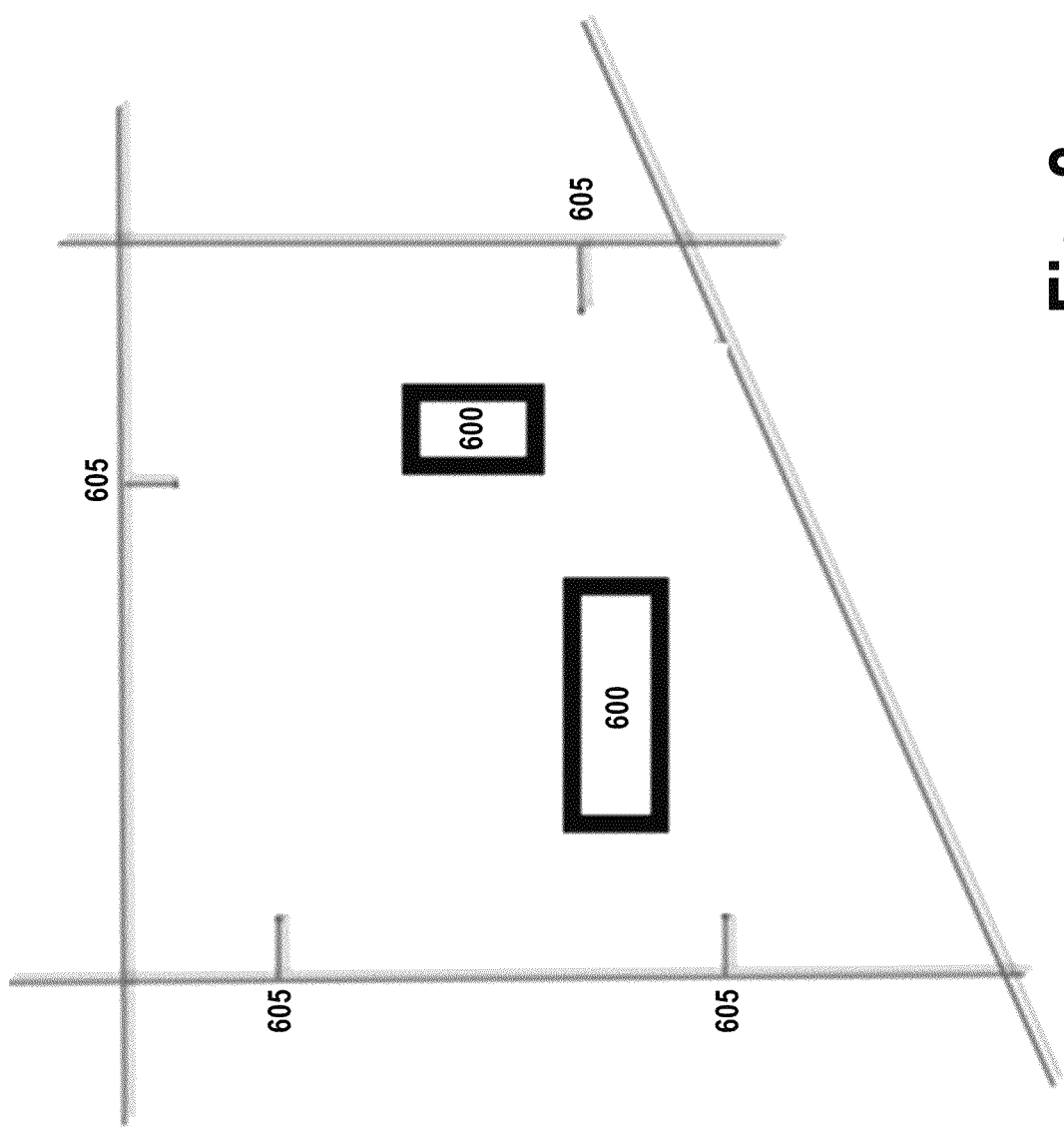

Fig. 9

| SERVICEABLE ADDRESS |
|---|
| STREET NUMBER |
| STREET NAME |
| CITY |
| COUNTY |
| STATE |
| ZIP CODE |
| COUNTRY |
| ADDRESS TYPE |
| STREET NETWORK CONNECTION POINT(S) LAT / LONG |
| FREIGHT DELIVERY POINT(S) LAT / LONG |
| PACKAGE DELIVERY POINT(S) LAT / LONG |
| LETTER DELIVERY POINT(S) LAT / LONG |
| ACCESS POINT(S) LAT / LONG |
| PARKING POINT(S) LAT / LONG |
| FRONT DOOR POINT(S) LAT / LONG |
| BACK DOOR POINT(S) LAT / LONG |
| SIDE DOOR POINT(S) LAT / LONG |

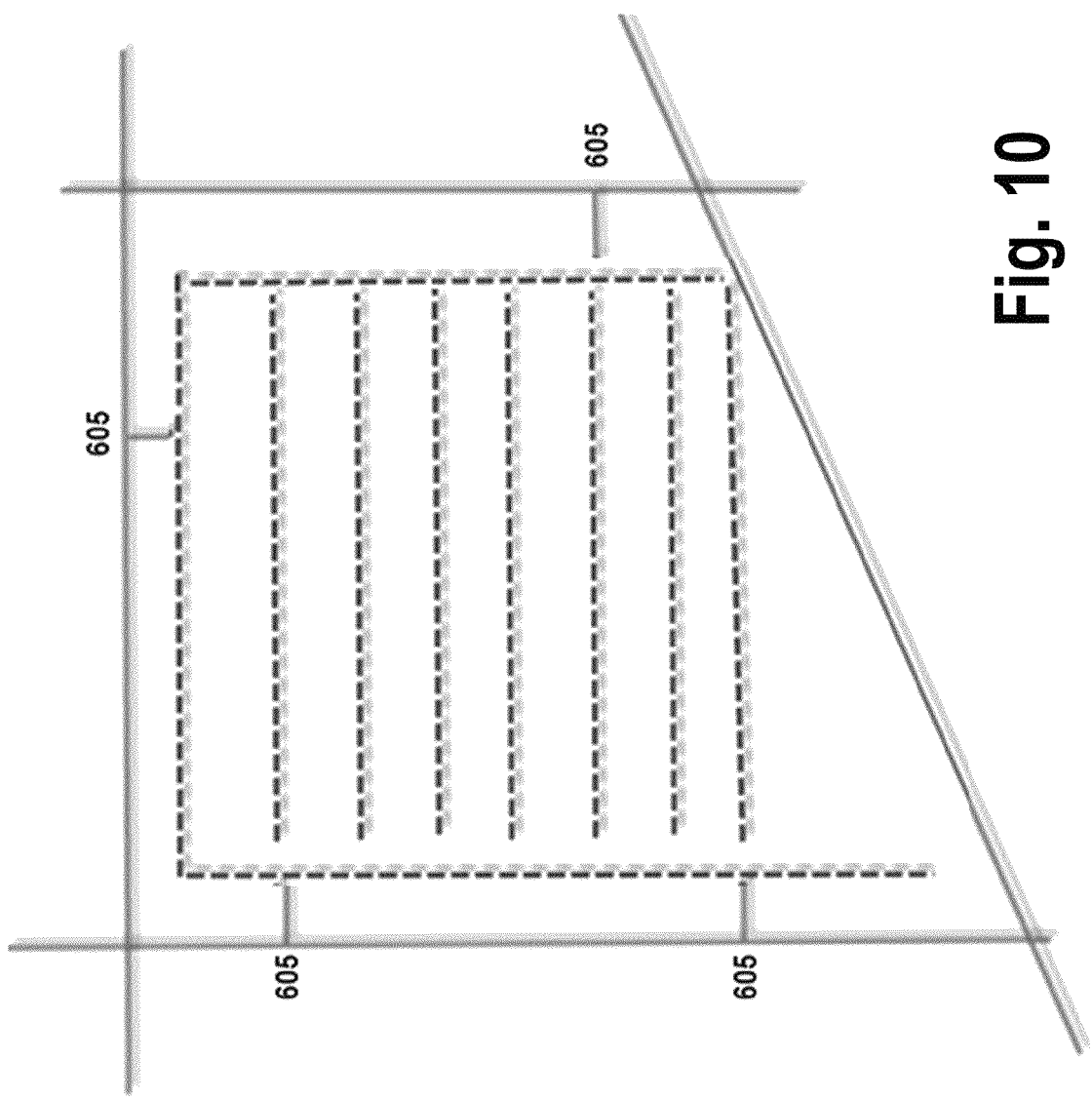

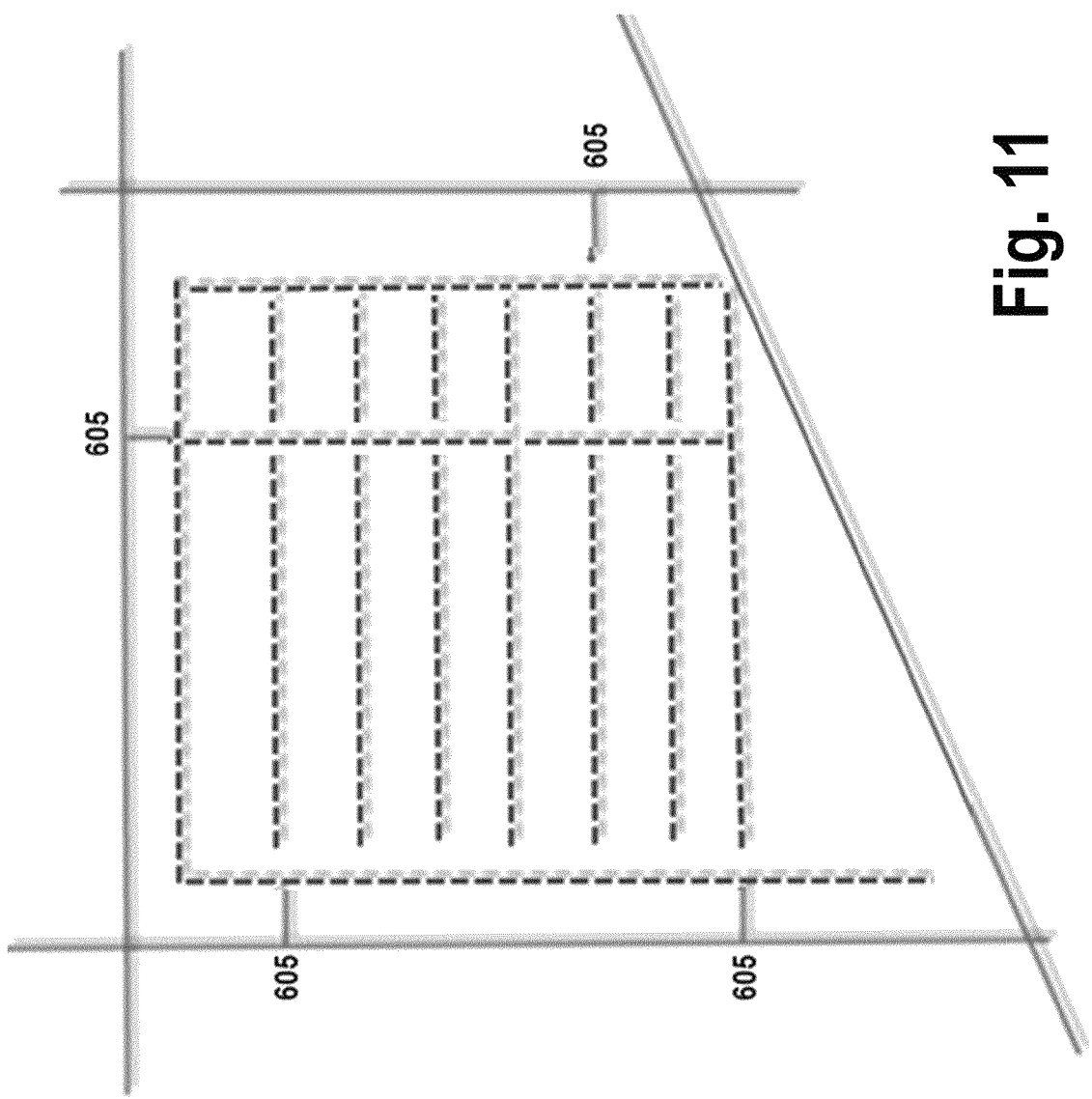

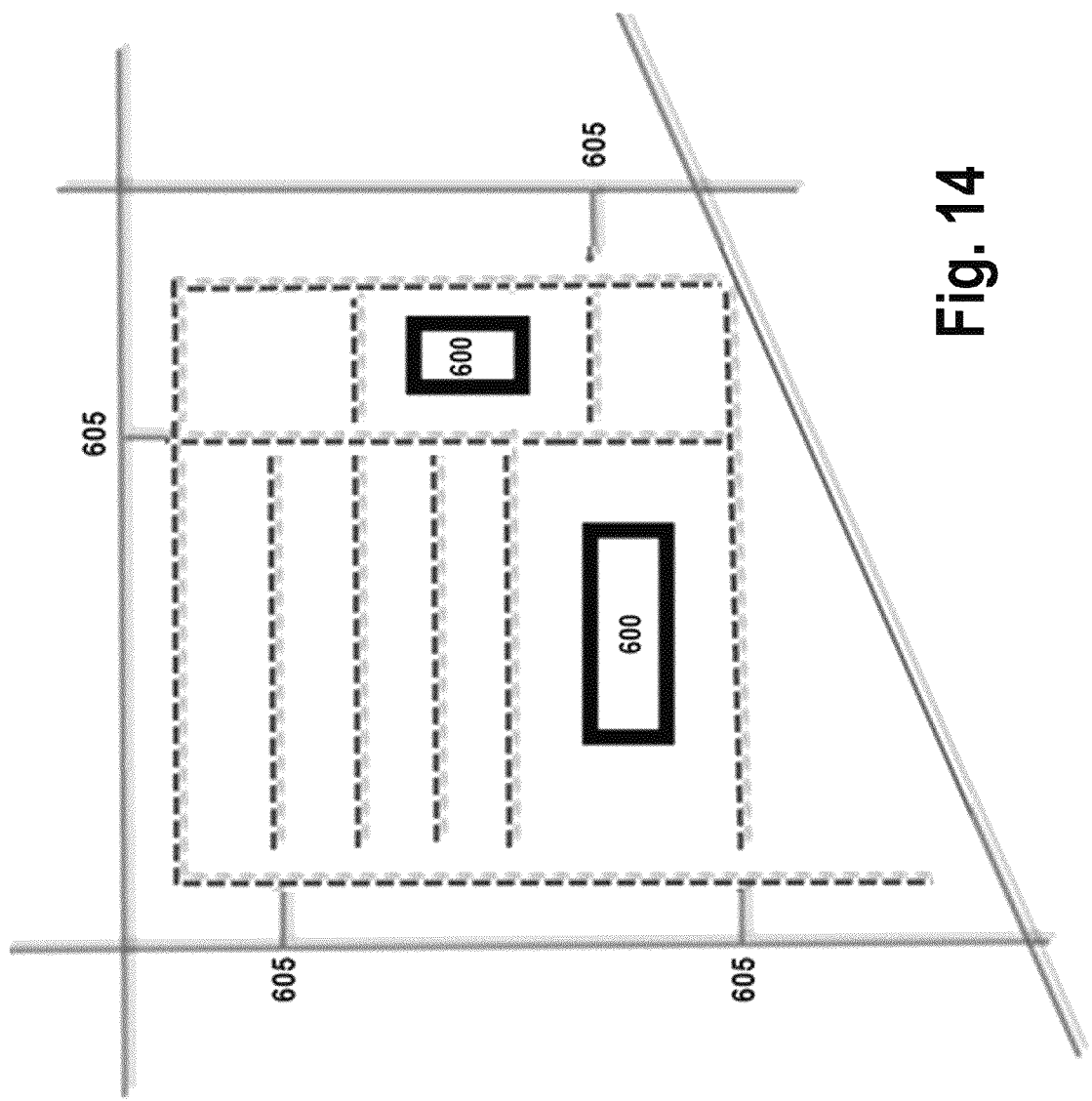

US 9,020,761 B2

CONCEPTS FOR DEFINING TRAVEL PATHS IN PARKING AREAS

CROSS-REFERENCE TO RELATED APPLICATIONS

This application is a continuation claims priority to U.S. application Ser. No. 13/795,258 filed Mar. 12, 2013, which is hereby incorporated herein in its entirety by reference.

BACKGROUND

Map vendors, such as Tele Atlas®, Telerik®, and NAVTEQ®, provide digital maps to a variety of clients for different purposes. For example, such companies may provide digital maps to (a) Internet websites for providing driving directions to consumers; (b) cellular companies to include in smartphones; (c) government agencies (e.g., the United States Department of Agriculture and Environmental Protection Agency) for use in their respective government functions; and (d) transportation and logistics companies, such as United Parcel Service of America, Inc. (UPS), for determining and optimizing delivery routes. Unfortunately, the digital maps provided by vendors do not generally include the travel paths in parking areas. For example, although digital maps can be used to provide navigational information for traveling to shopping malls, hospitals, parks, recreation areas, theme parks, and/or the like, they do not include, for example, the actual longitude and latitude coordinates of the travel paths within the parking areas at such locations. For transportation and logistics companies, information about travel paths in parking areas can be a paramount concern for routing and scheduling operations. Accordingly, if travel paths in parking areas are unknown or undeterminable, it can greatly impact a company's efficiency and routing and scheduling optimization.

BRIEF SUMMARY

In general, embodiments of the present invention provide methods, apparatus, systems, computing devices, computing entities, and/or the like for defining travel paths in parking areas.

In accordance with one aspect, a method for defining travel paths in parking areas is provided. In one embodiment, the method comprises (a) identifying a parking area in which there is at least one travel path for the parking area that is not represented on a digital map; (b) identifying one or more street network connection points for the parking area, the one or more street network connection points providing the ability to at least enter the parking area from or exit the parking area to a street network; and (c) defining one or more travel paths in the parking area by connecting the one or more street network connection points in the parking area.

In accordance with another aspect, a computer program product for defining travel paths in parking areas is provided. The computer program product may comprise at least one computer-readable storage medium having computer-readable program code portions stored therein, the computer-readable program code portions comprising executable portions configured to (a) identify a parking area in which there is at least one travel path for the parking area that is not represented on a digital map; (b) identify one or more street network connection points for the parking area, the one or more street network connection points providing the ability to at least enter the parking area from or exit the parking area to a street network; and (c) define one or more travel paths in the parking area by connecting the one or more street network connection points in the parking area.

In accordance with yet another aspect, an apparatus comprising at least one processor and at least one memory including computer program code is provided. In one embodiment, the at least one memory and the computer program code may be configured to, with the processor, cause the apparatus to (a) identify a parking area in which there is at least one travel path for the parking area that is not represented on a digital map; (b) identify one or more street network connection points for the parking area, the one or more street network connection points providing the ability to at least enter the parking area from or exit the parking area to a street network; and (c) define one or more travel paths in the parking area by connecting the one or more street network connection points in the parking area.

In accordance with one aspect, a method for defining travel paths in parking areas is provided. In one embodiment, the method comprises (a) identifying a parking area in which there is at least one travel path for the parking area that is not represented on a digital map; (b) identifying one or more street network connection points for the parking area, the one or more street network connection points providing the ability to at least enter the parking area from or exit the parking area to a street network; (c) defining a first set of one or more travel paths in the parking area by connecting the one or more street network connection points in the parking area; (d) defining a second set of one or more travel paths in the parking area by identifying one or more paths traversed by one or more vehicles in the parking area based at least in part on telematics data collected while the one or more vehicle were traversing the parking area; and (e) merging the first set of one or more travel paths with the second set of one or more travel paths.

In accordance with another aspect, a computer program product for defining travel paths in parking areas is provided. The computer program product may comprise at least one computer-readable storage medium having computer-readable program code portions stored therein, the computer-readable program code portions comprising executable portions configured to (a) identify a parking area in which there is at least one travel path for the parking area that is not represented on a digital map; (b) identify one or more street network connection points for the parking area, the one or more street network connection points providing the ability to at least enter the parking area from or exit the parking area to a street network; (c) define a first set of one or more travel paths in the parking area by connecting the one or more street network connection points in the parking area; (d) define a second set of one or more travel paths in the parking area by identifying one or more paths traversed by one or more vehicles in the parking area based at least in part on telematics data collected while the one or more vehicle were traversing the parking area; and (e) merge the first set of one or more travel paths with the second set of one or more travel paths.

In accordance with yet another aspect, an apparatus comprising at least one processor and at least one memory including computer program code is provided. In one embodiment, the at least one memory and the computer program code may be configured to, with the processor, cause the apparatus to (a) identify a parking area in which there is at least one travel path for the parking area that is not represented on a digital map; (b) identify one or more street network connection points for the parking area, the one or more street network connection points providing the ability to at least enter the parking area from or exit the parking area to a street network; (c) define a first set of one or more travel paths in the parking area by connecting the one or more street network connection points in the parking area; (d) define a second set of one or more travel paths in the parking area by identifying one or more paths traversed by one or more vehicles in the parking area based at least in part on telematics data collected while the one or more vehicle were traversing the parking area; and (e) merge the first set of one or more travel paths with the second set of one or more travel paths.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 6-14 illustrate exemplary input and output in accordance with various embodiments of the present invention.

DETAILED DESCRIPTION

Figure 1:
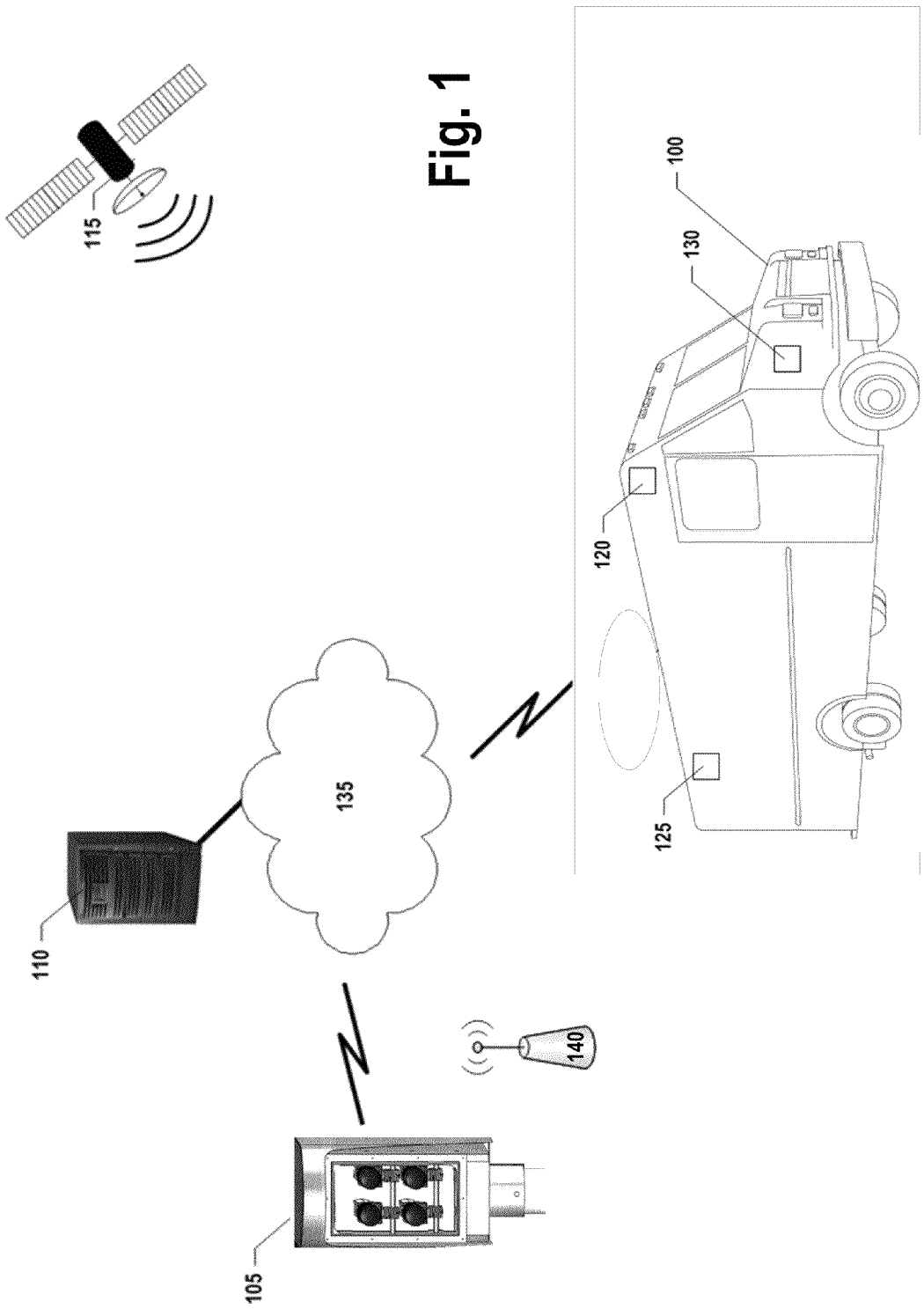
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

II. Exemplary Architecture

The system may include one or more vehicles 100, one or more imaging devices 105, one or more mapping systems 110, one or more Global Positioning System (GPS) satellites 115, one or more networks 135, one or more radio frequency identification (RFID) readers/interrogators 140, one or more mobile devices 145, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

a. Exemplary Vehicle

In various embodiments, a vehicle 100 may be a tractor, a truck, a car, a motorcycle, a moped, a Segway, a trailer, a tractor and trailer combination, a van, a flatbed truck, a delivery vehicle, and/or any other form of vehicle. In one embodiment, each vehicle 100 may be associated with a unique vehicle identifier (such as a vehicle ID) that uniquely identifies the vehicle 100. The vehicle 100 may be mobile in the sense that it may be able to move from one location to another under its own power. The unique vehicle ID (e.g., trailer ID, tractor ID, vehicle ID, and/or the like) may include characters, such as numbers, letters, symbols, and/or the like. For example, an alphanumeric vehicle ID (e.g., "1221A445533AS445) may be associated with each vehicle 100. In another embodiment, the unique vehicle ID may be the license plate, registration number, or other identifying information assigned to the vehicle 100.

Figure 2:
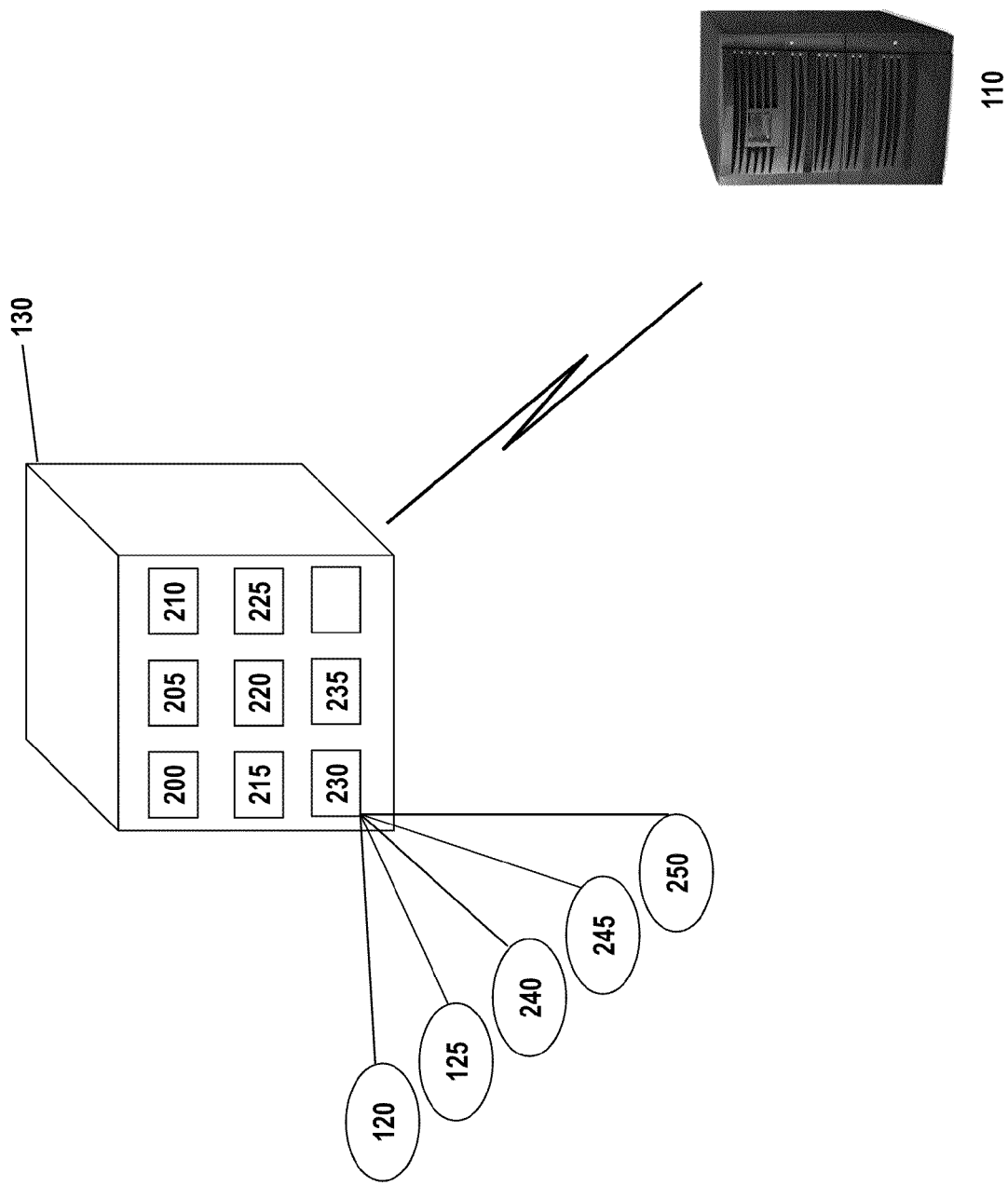
FIG. 2 is a diagram of a data collection device that may be used in association with certain embodiments of the present invention.

FIG. 1 shows one or more computing entities, devices, and/or similar words used herein interchangeably that are associated with the vehicle 100, such as an data collection device 130 or other computing entities. FIG. 2 provides a block diagram of an exemplary data collection device 130 that may be attached, affixed, disposed upon, integrated into, or part of a vehicle 100. The data collection device 130 may collect telematics data (including location data) and transmit/send the data to the imaging device 105, the mobile device 145, and/or the mapping system 110 via one of several communication methods.

In one embodiment, the data collection device 130 may include, be associated with, or be in communication with one or more processors 200, one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics data from various sensors (e.g., via a CAN-bus), one or more communication ports 205 for transmitting/sending data, one or more RFID tags/sensors 250, one or more power sources 220, one or more data radios 235 for communication with a variety of communication networks, one or more memory modules 210, and one or more programmable logic controllers (PLC) 225. It should be noted that many of these components may be located in the vehicle 100 but external to the data collection device 130.

In one embodiment, the one or more location sensors 120 may be one of several components in communication with or available to the data collection device 130. Moreover, the one or more location sensors 120 may be compatible with a Low Earth Orbit (LEO) satellite system or a Department of Defense (DOD) satellite system. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, geocode, course, position, time, and/or speed data (e.g., telematics data). The one or more location sensors 120 may also communicate with the mapping system 110, the data collection device 130, and/or similar computing entities.

As indicated, in addition to the one or more location sensors 120, the data collection device 130 may include and/or be associated with one or more telematics sensors 125. For example, the telematics sensors 125 may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like (e.g., telematics data). The telematics sensors 125 may include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data, and/or meteorological data (e.g., telematics data).

In one embodiment, the ECM 245 may be one of several components in communication with and/or available to the data collection device 130. The ECM 245, which may be a scalable and subservient device to the data collection device 130, may have data processing capability to decode and store analog and digital inputs from vehicle systems and sensors. The ECM 245 may further have data processing capability to collect and present telematics data to the J-Bus (which may allow transmission to the data collection device 130), and output standard vehicle diagnostic codes when received from a vehicle's J-Bus-compatible on-board controllers 240 and/or sensors.

As indicated, a communication port 230 may be one of several components available in the data collection device 130 (or be in or as a separate computing entity). Embodiments of the communication port 230 may include an Infrared data Association (IrDA) communication port, an data radio, and/or a serial port. The communication port 230 may receive instructions for the data collection device 130. These instructions may be specific to the vehicle 100 in which the data collection device 130 is installed, specific to the geographic area in which the vehicle 100 will be traveling, and/or specific to the function the vehicle 100 serves within a fleet. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

In one embodiment, each vehicle 100 may have an RFID tag/sensor attached or affixed thereto that stores the corresponding vehicle ID. Such an RFID tag/sensor can be placed inside a vehicle 100, or affixed to an outer surface of a vehicle 100, for example. The RFID tags/sensors may be passive RFID tags/sensors, active RFID tags/sensors, semi-active RFID tags/sensors, battery-assisted passive RFID tags/sensors, and/or the like. Thus, the RFID tags/sensors can include some or all of the following components: one or more input interfaces for receiving data, one or more output interfaces for transmitting data, a processor, a clock, memory modules, and a power source.

In another embodiment, each vehicle 100 may have its corresponding vehicle ID visible on the exterior of the vehicle 100. For example, the license plate number, registration number, alphanumeric characters, or other identifying information may be on the exterior of the vehicle such that one or more imaging devices can capture an image of the vehicle ID and properly identify it via analysis.

b. Exemplary Mapping System

Figure 3:
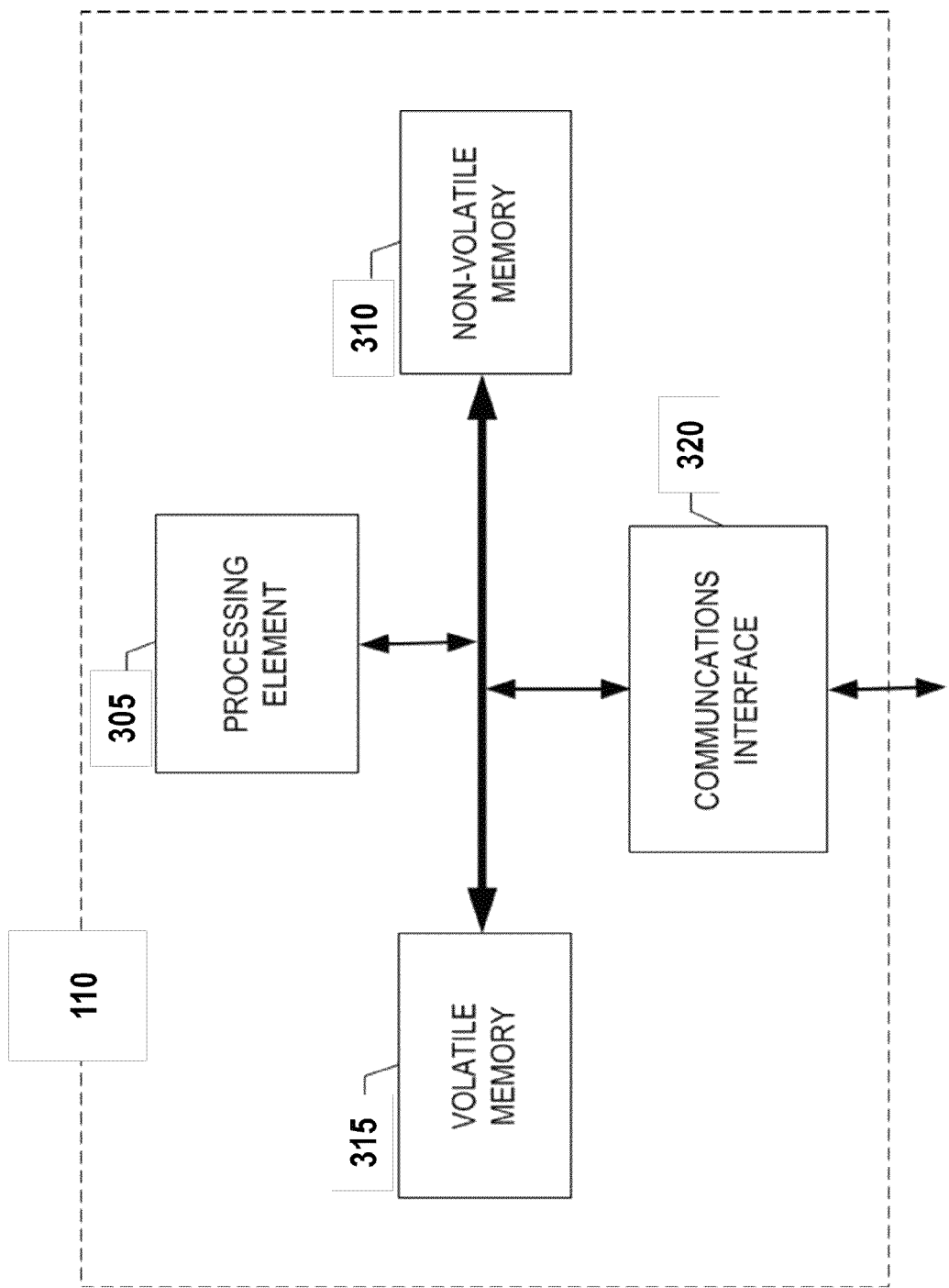
FIG. 3 is a schematic of a mapping system in accordance with certain embodiments of the present invention.

FIG. 3 provides a schematic of a mapping system 110 according to one embodiment of the present invention. In general, the term system may refer to, for example, one or more computers, computing devices, computing entities, mobile phones, desktops, tablets, notebooks, laptops, distributed systems, servers, blades, gateways, switches, processing devices, processing entities, relays, routers, network access points, scanners, cameras, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the mapping system 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the mapping system 110 may communicate with vehicles 100, imaging devices 105, RFID interrogators/readers 140, mobile devices 145, and/or the like.

As shown in FIG. 3, in one embodiment, the mapping system 110 may include or be in communication with one or more processing elements 305 (also referred to as processors, processing circuitry, and/or similar terms used herein interchangeably) that communicate with other elements within the mapping system 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the mapping system 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database mapping systems, data, applications, programs, program modules, scripts, source code, object code, byte code, compiled code, interpreted code, machine code, executable instructions, and/or the like. The term database, database instance, database mapping system, and/or similar terms used herein interchangeably may refer to a structured collection of records or data that is stored in a computer-readable storage medium, such as via a relational database, hierarchical database, and/or network database.

In one embodiment, the mapping system 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database mapping systems, data, applications, programs, program modules, scripts, source code, object code, byte code, compiled code, interpreted code, machine code, executable instructions, and/or the like being executed by, for example, the processing element 305. Thus, the databases, database instances, database mapping systems, data, applications, programs, program modules, scripts, source code, object code, byte code, compiled code, interpreted code, machine code, executable instructions, and/or the like may be used to control certain aspects of the operation of the mapping system 110 with the assistance of the processing element 305 and operating system.

As indicated, in one embodiment, the mapping system 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the mapping system 110 may communicate with computing entities or communication interfaces of the vehicle 100, the imaging devices 105, RFID interrogators/readers 140, mobile devices 145, and/or the like.

Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the mapping system 110 may be configured to communicate via wireless external communication networks using any of a variety of protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the mapping system 110 may include or be in communication with one or more input elements, such as a keyboard input, a mouse input, a touch screen/display input, audio input, pointing device input, joystick input, keypad input, and/or the like. The mapping system 110 may also include or be in communication with one or more output elements (not shown), such as audio output, video output, screen/display output, motion output, movement output, and/or the like.

As will be appreciated, one or more of the mapping system's 110 components may be located remotely from other mapping system 110 components, such as in a distributed system. Furthermore, one or more of the components may be combined and additional components performing functions described herein may be included in the mapping system 110. Thus, the mapping system 110 can be adapted to accommodate a variety of needs and circumstances.

c. Exemplary Mobile Device

Figure 4:
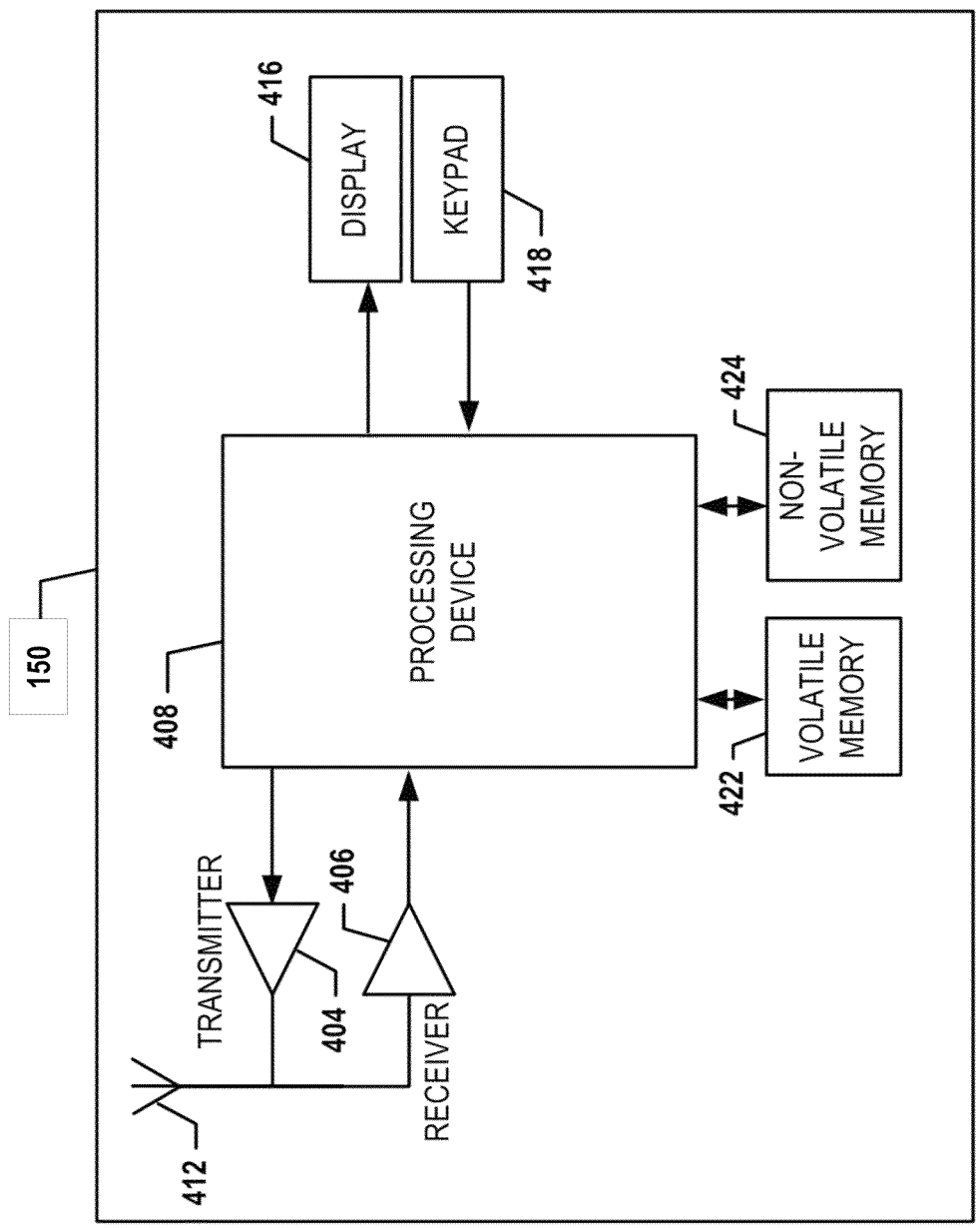
FIG. 4 is a schematic of a mobile device in accordance with certain embodiments of the present invention.

FIG. 4 provides an illustrative schematic representative of a mobile device 145 that can be used in conjunction with embodiments of the present invention. Mobile devices 145 can be operated by various parties, including operators of vehicles 100. As shown in FIG. 4, a mobile device 145 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling data in accordance with an air interface standard of applicable wireless systems to communicate with various entities, such as vehicles 100, imaging devices 105, mapping system 110, RFID interrogators/readers 140, and/or the like. In this regard, the mobile device 145 may be capable of operating with one or more air interface standards, communication protocols, modulation types, and access types. More particularly, the mobile device 145 may operate in accordance with any of a number of wireless communication standards and protocols. In a particular embodiment, the mobile device 145 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 145 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 145 can also download changes, add-ons, and updates, for instance, to its firmware, software (e.g., including executable instructions, applications, program modules), and operating system.

According to one embodiment, the mobile device 145 may include a location determining device and/or functionality. For example, the mobile device 145 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 145 may also comprise a user interface (that can include a display 416 coupled to a processing element 408) and/or a user input interface (coupled to a processing element 408). The user input interface can comprise any of a number of devices allowing the mobile device 145 to receive data, such as a keypad 418 (hard or soft), a touch display, voice or motion interfaces, or other input device. In embodiments including a keypad 418, the keypad 418 can include (or cause display of) the conventional numeric (0-9) and related keys (#, *), and other keys used for operating the mobile device 145 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 145 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 145.

d. Exemplary Imaging Devices

Embodiments of the present invention may also include one or more imaging devices 105 positioned at staging areas, transportation and logistics areas, hub or center areas, on vehicles 100, carried by delivery personnel, and/or the like. An imaging device 105 may include one or more cameras, one or more laser scanners, one or more infrared scanners, one or more imagers, one or more video cameras, one or more still cameras, one or more Internet Protocol (IP) cameras, one or more traffic cameras, and/or the like. Such imaging devices 105 may be include one or more wide angle lenses or one or more narrow angle lenses. The imaging devices 105 may also include one or more processors and one or more temporary memory storage areas, such as circular buffers. Thus, the imaging devices 105 can capture images (e.g., image data) and store them temporarily in the temporary memory storage area or permanently (in a separate memory storage area) within the imaging devices 105. In one embodiment, the imaging devices 105 may also be connected to (or include) one or more network interfaces (e.g., wired or wireless) for communicating with various computing entities. This communication may be via the same or different wired or wireless networks using a variety of wired or wireless transmission protocols. This may allow the imaging devices to transmit/send images (e.g., image data) they capture.

Figure 7:
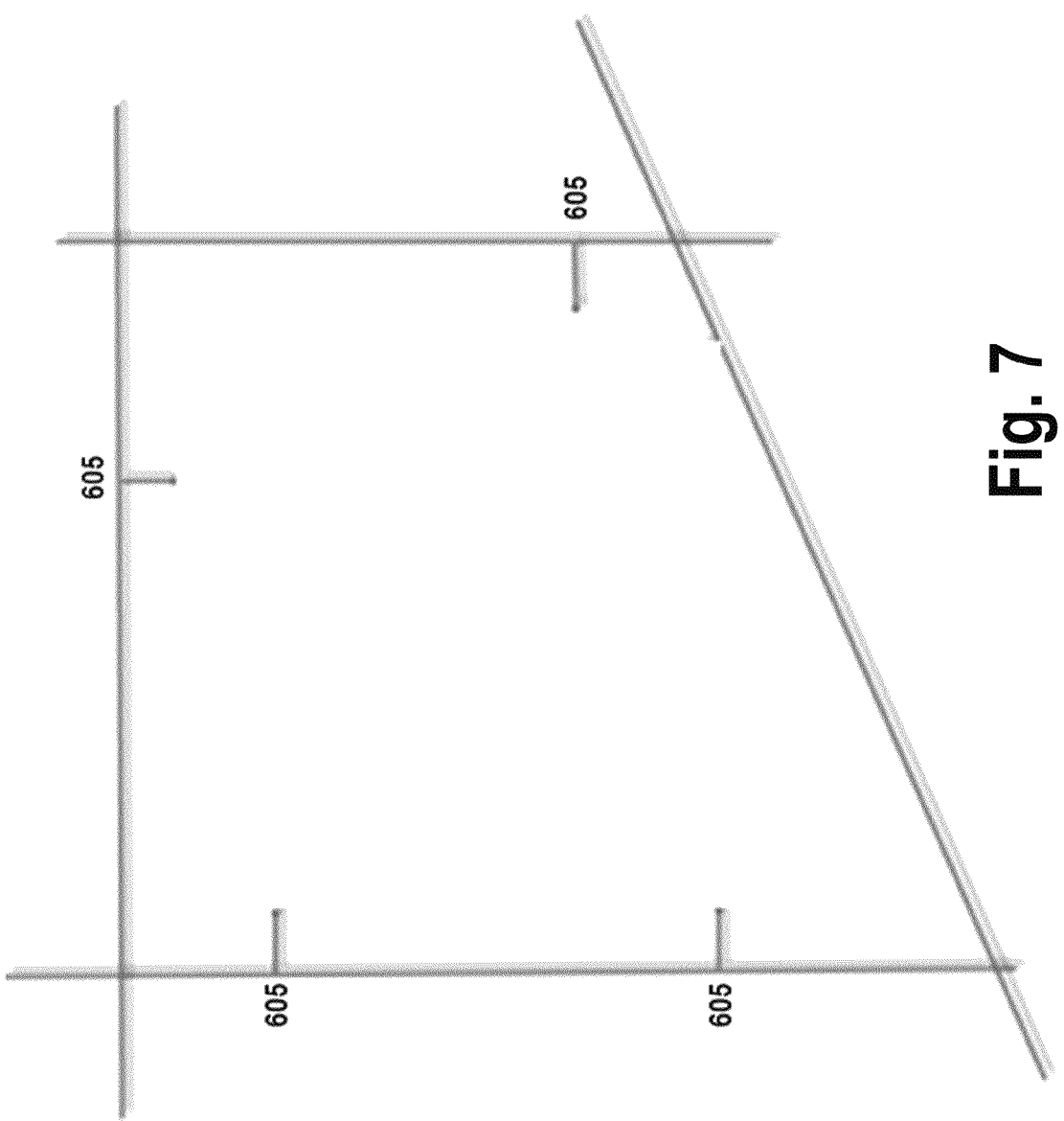

In one embodiment, the imaging devices 105 can be positioned to capture image data in zones of interest at staging areas, transportation and logistics areas, hub or center areas, and/or the like. Exemplary zones of interest are shown in FIGS. 6 and 7. The imaging data captured by the imaging devices 105 in the zones of interest may include (as determined from analysis) a vehicle ID, image of driver's faces (for use in facial recognition), and/or the like. The number of imaging devices 105 used may vary based on the desired configuration.

The resolution of the images (e.g., image data) captured by the imaging device 105 may be, for instance, 640 pixels by 480 pixels or higher. In one embodiment, for night operation, the imaging devices 105 may have a sensitivity of 0.5 lux or better at an optical stop equivalent of F1. Further, the imaging devices 105 may include or be used in association with various lighting, such as light emitting diodes (LEDs), Infrared lights, array lights, strobe lights, and/or other lighting mechanisms to sufficiently illuminate the zones of interest to capture image data for analysis. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like.

The imaging devices 105 may also be connected to (or include) a network interface (e.g., the wireless Ethernet bridge) for communicating with various computing entities. In one embodiment, the imaging devices 105 can communicate with the mapping system 110 using protocols and stacks, such as sockets. The network interface may provide the ability for each imaging device 105 to serve as a web host with, for example, web pages that can be used to setup and configure the imaging devices 105. Moreover, via the web pages (or via the mapping system 110), the imaging devices 105 can provide a live view of the zones of interest, which can be used to aim and focus the imaging devices 105. This can also provide the functionality of controlling the exposure, gain, gamma, white balance, compression, and numerous other attributes of the imaging devices 105. Thus, via the network interface, the imaging devices 105 may provide access for a user to (a) remotely configure (e.g., control the exposure, gain, gamma, and white balance of the images) the imaging devices 105; (b) remotely access captured images; or (c) synchronize the time on the imaging devices 105 to a consistent network time.

e. RFID Readers/Interrogators

Embodiments of the present invention may also use one or more RFID readers/interrogators 140 positioned at staging areas, transportation and logistics areas, hub or center areas, and/or the like. As will be recognized, the one or more RFID readers/interrogators 140 may be used to extract data stored or collected by the RFID tags/sensors (such as vehicle IDs) affixed to vehicles 100. For example, the one or more RFID readers/interrogators 140 can transmit/send a signal (e.g., a radio frequency (RF) signal) that prompts and/or powers RFID tags/sensors affixed to vehicles 100 within a geographical range (e.g., a read range) to provide data from the memory of the tags/sensors to the appropriate computing entity or communication interface of the one or more RFID readers/ interrogators 140.

As will be recognized, the read range may vary based on the particular technology being used. For example, in an embodiment using Bluetooth, the read range of a computing entity (e.g., imaging device 105 or computing entity or communication interface associated with a vehicle 100) transmitting/sending a Bluetooth signal/request may be up to 30 feet (whereas a Wi-Fi may provide a read range of 100-300 feet). Thus, RFID tags/sensors within that 30-foot read range may receive the signal/request. Other technologies and protocols may reduce or increase the read range. These technologies and protocols include GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, USB protocols, and/or any other wireless protocol. In addition to interrogating/reading RFID tags/sensors, these communication capabilities may enable the one or more RFID readers/interrogators 140 to communicate with vehicles 100, imaging devices 105, mapping systems 110, mobile devices 145, and/ or the like.

In one embodiment, the one or more RFID readers/interrogators 140 can transmit/send a signal/request (to be received by RFID tags/sensors within the read range) on a periodic, continuous, regular basis or in response to certain triggers. For example, in one embodiment, the one or more RFID readers/interrogators 140 can transmit/send a signal/ request to be received by RFID tags/sensors within the read range every 5 seconds, every 10 seconds, every 60 seconds, every 10 minutes, every 60 minutes, and/or the like. In another embodiment, the one or more RFID readers/interrogators 140 can transmit/send a signal/request to be received by RFID tags/sensors within the read range in response to certain triggers, such as a vehicle 100 entering or exiting a geofenced area associated with a staging area, customs area, checkpoint area, and/or the like. As will be recognized, a variety of other approaches and techniques may be used to adapt to various needs and circumstances.

III. Exemplary Operation

Figure 5:
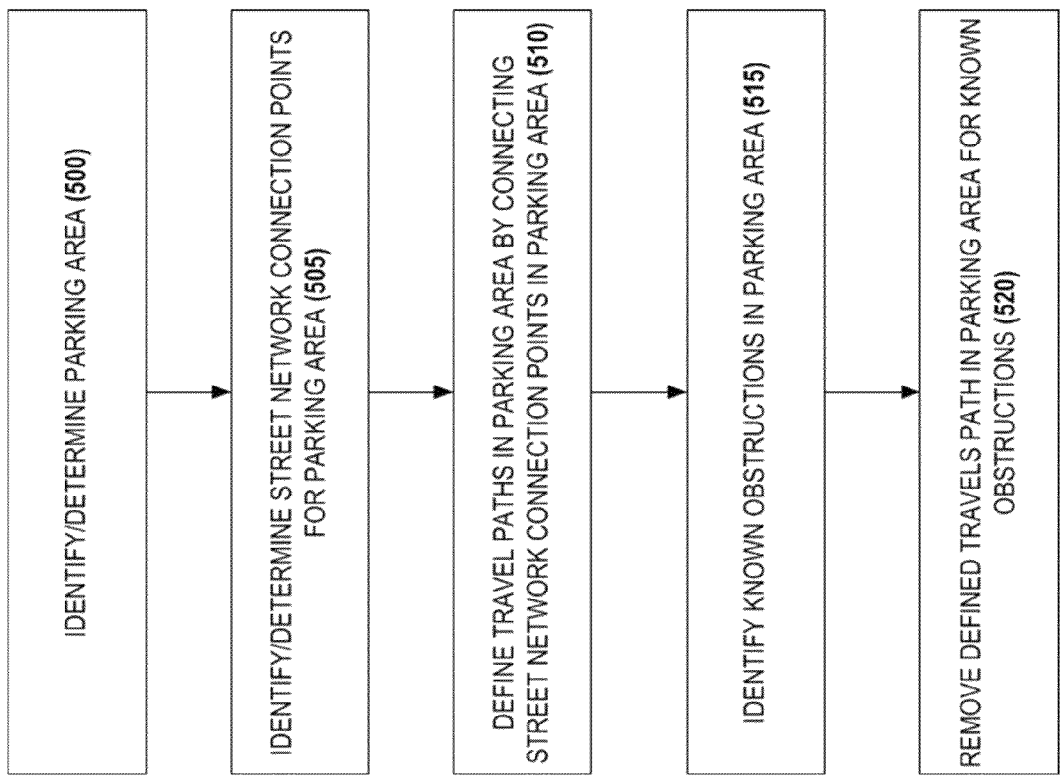
FIG. 5 is a flowchart illustrating operations and processes that can be used in accordance with various embodiments of the present invention.

Reference will now be made to FIGS. 5-14. FIG. 5 is a flowchart illustrating operations and processes that can be used in accordance with various embodiments of the present invention. FIGS. 6-14 illustrate exemplary input and output in accordance with various embodiments of the present invention.

a. Serviceable Addresses and Street Networks

An exemplary "serviceable address" 600 is shown in FIG. 6. A serviceable address 600 may be any location associated with an address or other identifiable location. For example, a serviceable address 600 may be a residential location, such as one or more homes, one or more mobile homes, one or more apartments, one or more apartment buildings, one or more condominiums, one or more townhomes, and/or the like. Similarly, a serviceable address 600 may also be a commercial location, such as one or more stores in a mall, one or more office buildings, one or more office parks, one or more offices of an apartment complex, one or more garages, one or more warehouses, and/or the like.

In one embodiment, a street network may be used to travel to serviceable addresses, with one or more street network connection points 605 providing the ability to enter the street network from or exit the street network to the serviceable address. A "street network" is collection of navigable roads, streets, highways, paths, and/or the like represented in a digital map. Based on the street network, map data of the digital map can be used to provide directions for traveling within a street network to serviceable addresses 600. To do so, digital maps may include various information about street networks, such as the longitude of street segments, latitude of street segments, altitude of street segments, speed limits of street segments, direction restrictions for street segments, time penalties for street segments, tax information for street segments, and/or other information associated with street segments or street networks. In one embodiment, a street segment of a street network may be represented by a street name, an address range, and series of longitude and latitude coordinates that define the overall shape and location of the street segment.

b. Points for Serviceable Addresses

In one embodiment, each serviceable address may correspond to one or more points at the serviceable address. One such point may be a street network connection point 605. As previously noted, a street network connection point 605 may be a location at which, for example, the serviceable address 600 is accessible from the street network. For instance, a street network connection point 605 may be an entrance to a parking area from a street network for one or more serviceable addresses or an exit from a parking area to a street network for one or more serviceable addresses. Similarly, a street network connection point 605 may be the start of a driveway, private road, recreational area, and/or the like that corresponds to one or more serviceable addresses. FIGS. 7 and 8 show four street segments surrounding a parking area. From these figures, it can be seen that the parking area can either be at least entered from or exited from the four street network connection points 605.

As shown in FIG. 9, each serviceable address may also be associated with a variety of other points, such as one or more freight delivery points, one or more package delivery points, and/or one or more letter delivery points. Such points may be the locations (e.g., driveway, door, house, or building) at which, for example, freight, packages, letters and/or the like are actually delivered with regard to a given serviceable address 600 (within or outside of a street network). For instance, some business may allow for letters to be delivered to the front door, while requiring that packages and freight be delivered at another location at the serviceable address 600. Depending on the size of the serviceable address 600, the distance between such points may be considerable. Similarly, for businesses or residences that are not located directly on a street network, such as requiring access through a long driveway or parking areas, the delivery points may, for example, require a driver to travel on a driveway or parking area that extends $2/10$ of a mile off of the street network to deliver an item or actually arrive at the serviceable address 600.

As will be recognized, not all serviceable addresses 600 have multiple street network connection points 605 and/or multiple delivery points. This may be the case, for instance, when a serviceable address 600 represents a single dwelling home with one driveway. In other embodiments, multiple street network connection points 605 and/or delivery points may be necessary for a single serviceable address 600. For example, multiple street network connection points 605 may be used if there is more than one entrance to travel to a serviceable address 600 from a street network, such as a commercial location with entrances on two or three different streets (e.g., a store in a mall).

In one embodiment, each serviceable address 600 may also be associated with one or more access points and/or parking points parking points. An access point may be a checkpoint, gate, or door, for example, that must be entered or passed through to access a serviceable address 600. A parking point may be, for example, a location at which one can park at a serviceable address 600. Each serviceable address 600 may also correspond to one or more door points, such as one or more front door points, one or more back door points, and/or one or more side door points. Such locations may identify the front, back, and/or side doors of a particular structure at a serviceable address 600.

In one embodiment, information about the points described above and various other points for serviceable addresses can be collected and/or stored in a record corresponding to the serviceable address 600, such as the record shown in FIG. 9. Such records and data may be stored as data in a digital map, for example. As will be recognized, a variety of other approaches and techniques can be used to adapt to various needs and circumstances.

c. Collecting Telematics Data about Points for Serviceable Addresses

In one embodiment, information associated with the different points for serviceable addresses can be collected, identified, determined, and/or stored using a variety of techniques and approaches. For example, information regarding street network connection points 605 may be base data provided by a digital map vendor or may include the digital map vendor's base data combined with geo coordinates (e.g., provided by a third party). Such information about these points may be collected using various methods. For example, such information may be collected via the data collection device 130 and/or the mobile device 145 (with or without the aid of the driver of the vehicle 100) and/or determined by using methods such interpolation.

1. Regular, Manual, or Triggered Collection of Telematics Data for Serviceable Addresses In one embodiment, the data collection device 130 or mobile device 145 can provide the functionality to maintain and/or process telematics data (including location data comprising geo coordinate samples) for serviceable addresses that are visited, for example, based on items that are delivered to or picked up from the serviceable address. In one embodiment, the mobile device 145 can be adapted to be used to collect telematics data (including location data comprising geo coordinate samples) at each serviceable address visited. More specifically, the mobile device 145 can be configured to collect telematics data (including location data comprising geo coordinate samples) regularly, periodically, and/or continuously or upon determining the occurrence of one or more predefined trigger events. Such predefined trigger events may include, but are not limited to: (1) scan events; (2) an electronic signature capture event; (3) an input to the mobile device 145 indicating that a driver is at a particular serviceable address 600; (4) an input or event that indicates to the mobile device 145 that an item has been picked up from or delivered to the serviceable address; (5) an input specifically instructing the mobile device 145 to capture a sample; (6) when the mobile device 145 determines that the vehicle 100 (or driver walking with the mobile device 145) has entered or exited the street network; (7) when the vehicle 100 is placed in the park position; (8) ignition of the vehicle 100; and/or (8) the like. Thus, for visits to each serviceable address 600, one or more geo coordinate samples (e.g., telematics data including location data) may be collected by the mobile device 145 in response to various trigger events.

In another embodiment, the data collection device 130 can collect telematics data (including location data comprising geo coordinate samples) on a periodic, regular, and/or continuous basis. For example, the data collection device 130 can continuously collect telematics data (including location data comprising geo coordinate samples) as the vehicle 100 traverses street networks and/or parking areas. Moreover, the data collection device 130 can also be configured to collect telematics data (including location data comprising geo coordinate samples) in response to predefined trigger events, such as the vehicle 100 exiting or entering a street network, the ignition of the vehicle 100, and/or those discussed above with respect to the mobile device 145.

As indicated, in one embodiment, the mobile device 145 or data collection device 130 is configured to continuously and/or periodically store telematics data (including location data comprising geo coordinate samples), regardless of whether a trigger event has occurred. This may be beneficial since geo coordinates may not always be available at any given time since, for example, a GPS signal could be temporarily blocked by a nearby obstruction. Thus, for instance, if a trigger event occurs at a time when a geo coordinate is not immediately obtainable, the last known geo coordinate (or in some embodiments the next geo coordinate) can be used. In such embodiments, the mobile device 145 or data collection device 130 may store information about the time of the geo coordinate sample and the time of the associated trigger event so that the mapping system 110 may use the information in determining the accuracy of the telematics data (including location data comprising geo coordinate samples) and coordinating the same.

In one embodiment, the information regarding the various points for a serviceable address 600 can be uploaded to the mapping system 110, which, after sufficient telematics data (including location data comprising geo coordinate samples) has been collected for a serviceable address 600, processes the information (e.g., sample geo coordinates) and stores information about the points in a record for the corresponding serviceable address 600—see FIG. 9. For example, the mapping system 110 may be configured to require two, three, or more consistent sample geo coordinates for a given point associated with a serviceable address before storing the information for the point in a record for the serviceable address 600. Also, it should be noted that the mobile device 145 or data collection device 130 may receive information about points for serviceable addresses as input from the driver of the vehicle 100. Regardless, the mapping system 110 can store point information for each serviceable address in a record for the serviceable address, shown in FIG. 9.

In one embodiment, points for serviceable addresses may include, for example, longitude and latitude coordinates, geocodes, altitude, course, speed, distance, UTC, and date information, or the like. Such information may be stored in a record for the corresponding serviceable address as part of a digital map—as shown in FIG. 9. For instance, in the examples shown in FIGS. 6-8, latitude and longitude information for the four street network connection points 605 corresponding to the serviceable addresses 600 shown in these figures can be stored in one or more records.

2. Geofence-Based Collection of Map Information

In one embodiment, geofences can be used to collect telematics data (including location data comprising geo coordinate samples) at each serviceable address visited. In one embodiment, a computing entity (e.g., mapping system 110) may define one or more geofences around geographic areas, such as serviceable addresses. The geofences may be defined to surround a defined geographic area, such as surrounding countries, regions, states, counties, cities, towns, interstates, roads, streets, avenues, toll roads, zip codes, area codes, ways, exit and entrance ramps, delivery routes, bus routes, taxis routes, industrial parks, neighborhoods, off-road areas (e.g., areas without paved roads), private land areas, parking areas, parcels, driveways, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic area. Geofences may be as large as an entire country, region, state, county, city, or town (or larger). The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention. Similarly, a geofence may overlap or reside wholly within another geofence. For example, a geofence of a parking area, for instance, may have geofences defined around stores or businesses in the parking area.

In one embodiment, after the one or more geofenced areas (e.g., geofences) have been defined, the location of the vehicle 100 can be monitored. Generally, the location of the vehicle 100 can be monitored by any of a variety of computing entities, including the data collection device 130, the mobile device 145, and/or the mapping system 110. For example, as noted above, the vehicle's 100 location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the vehicle's 100 location, a computing entity (data collection device 130, mobile device 145, or mapping system 110) can determine, for example, when the vehicle 100 enters a defined geofence.

In one embodiment, in response to (parking area), a computing entity (e.g., the data collection device 130, mobile device 145, or mapping system 110) can collect, identify, and/or store/record relevant telematics data. For example, the data collection device 130 can collect, identify, and/or store/record telematics data (including latitude, longitude, direction, altitude, geocode, course, position, time, and/or speed data) about the area being traversed while within the geofenced area. Similarly, the data collection device 130 can collect, identify, and/or store/record telematics data about where a delivery or pickup is made within the geofenced area. As will be recognized, a variety of other data (e.g., telematics data) can also be collected, identified, and/or stored/recorded, such as speed data, geofenced area data (e.g., the triggering geofence), emissions data, engine data, tire pressure data, oil pressure data, idle data, meteorological data, image data, and/or the like. In one embodiment, the collected geocode and/or telematics data can be routinely, periodically, and/or continuously transmitted to, for example, the mapping system 110.

In one embodiment, after the vehicle 100 has entered the geofenced area, the location of the vehicle 100 can continue to be monitored by any of a variety of computing entities. By using the vehicle's 100 location, a computing entity can determine, for example, when the vehicle 100 exits the defined geofenced area. As described, this may include using location-determining devices, location sensors 120 (e.g., GNSS sensors), or other telemetry location services (e.g., cellular assisted GPS or real time location system or server technology using received signal strength indicators from a Wi-Fi network).

In another embodiment, in response to (e.g., after) a determination that a vehicle 100 has exited the defined geofenced area (such as a street network), a computing entity can collect, identify, and/or store/record relevant data. For instance, the data collection device 130 can collect, identify, and/or store/record telematics data (including latitude, longitude, location, direction, altitude, geocode, course, position, time, and/or speed data) about the area being traversed outside the geofenced area. Similarly, the data collection device 130 can collect, identify, and/or store/record telematics data about where a delivery or pickup is made outside the geofenced area. As described, a variety of other data (e.g., telematics data) can also be collected, identified, and/or stored/recorded, such as speed data, emissions data, geofenced area data (e.g., the triggering geofence), RPM data, tire pressure data, oil pressure data, idle data, meteorological data, and/or the like. Moreover, the collected geocode and/or telematics data can be routinely, periodically, and/or continuously transmitted to, for example, the mapping system 110. Such collected data can then be stored in records and/or as data in a digital map, for example.

d. Defining Travel Paths in Parking Areas

Although digital maps typically include information about the location, shape, direction, and speed of street segments in a street network, such information is not generally available for parking areas. For companies that have employees or vehicles 100 that traverse parking areas on a regular basis, understanding the travel paths in parking areas can assist such entities in the optimization of routing, scheduling, planning, and/or tracking processes.

1. Identifying Parking Areas

In one embodiment, identifying travel paths in parking areas may begin with identifying a parking area in which there is at least one travel path for the parking area that is not represented in a digital map (Block 500 of FIG. 5). FIGS. 7 and 8 show a parking area with at least one travel path for the parking area not represented in the digital map. As can be seen from these figures, the parking area is surrounded by four separate street segments of a street network. This particular parking area also has four street network connection points 605 for access to or from the street network for the two corresponding serviceable addresses 600.

In one embodiment, such parking areas may be identified using various techniques and approaches. In one embodiment, such parking areas can be identified by the mapping system 110 from imagery of the parking areas (e.g., captured by one or more imaging devices 105). Imagery of a parking area may be captured by satellites, be captured as manned or unmanned aircraft fly over the parking area, and/or be captured by vehicles 100 traversing the parking area or by personnel traversing the parking area (collected manually or in response to various triggers). The parking areas may then be automatically determined from color changes, for example, in the imagery. In another embodiment, the mapping system 110 can also identify/determine parking areas from zoning information, surveys, building boundaries, identified business addresses with delivery points that are not on the street network, and/or street segment data. In another embodiment, parking areas can determined based on telematics data indicating when a vehicle 100 entered or exited a street network from or to a parking area, such as being identified as off-road travel (or off-street-network travel). The functionality for identifying off-road travel (or off-street-network travel) is described in U.S. Publ. Appl. 2012-0253861, which is incorporated herein in its entirety by reference. Such determinations can be made by the mapping system 110 from the telematics data that was collected as previously described.

In another embodiment, the mapping system 110 can identify/determine parking areas from underlying layers in maps, such as base layers. And in yet another embodiment, the mapping system 110 can identify/determine parking areas from user input. For example, a user may operate a mouse or other input device to manually draw a polygon around a parking area to identify the parking area as such to the mapping system 110. Using yet another approach, when a driver of a vehicle 100 visits a parking area, the driver can enter input via the mobile device 145 indicating that he/she is traversing a parking area, then the telematics data (including location data comprising geo coordinate samples) can be tagged, for example, as being associated with a specific parking area. In such a scenario, the driver of the vehicle 100 may also enter input via the mobile device 145 when he/she exits the parking area to indicate that he/she is no longer traversing the parking area. As will be recognized, a variety of other approaches and techniques can be used to adapt to various needs and circumstances.

2. Identifying Street Network Connection Points for Parking Areas

After identifying a parking area in which there is at least one travel path for the parking area that is not represented on a digital map, the mapping system 110 can identify one or more street network connection points 605 for the parking area (Block 505 of FIG. 5).

In one embodiment, identifying the street network connection points 605 for a parking area may include first identifying the serviceable addresses 600 for the parking area. For instance, the parking area shown in FIGS. 7-8 has two serviceable addresses that are accessible via or within the parking area. After identifying the serviceable addresses 600, the mapping system 110 may identify the records corresponding to those serviceable addresses and retrieve the corresponding street network connection points 605 for the same, which may be part of one or more map layers of a digital map.

In an embodiment in which a user operates a mouse or other input device to manually draw a polygon around a parking area to identify the parking area as such to the mapping system 110, the mapping system 110 can identify street network connection points 605 for the parking area identified within the polygon, for example. In another embodiment, street network connection points 605 can be identified based on telematics data indicating when a vehicle 100 entered or exited a street network from or to a parking area, such as being identified as off-road travel (or off-street-network travel). The functionality for identifying off-road travel is described in U.S. Publ. Appl. 2012-0253861. Such determinations can be made by the mapping system 110 from the telematics data that was collected as previously described.

3. Connecting Street Network Connection Points

After identifying the street network connection points 605 for a parking area, the mapping system can define one or more travel paths (e.g., a first set of travel paths) in the parking area by connecting the one or more street network connection points 605 in the parking area (Block 510 of FIG. 5). In one embodiment, this may include the mapping system 110 defining travel paths connecting the street network connection points 605 using a matrix, lattice graph, mesh graph, grid graph, and/or the like where each line defines a travel path within the parking areas. FIGS. 10 and 11 show an embodiment in which the mapping system 110 has defined travel paths in the parking area by connecting the four street network connection points 605.

The travel paths defined by the mapping system 110 in FIGS. 10 and 11 run vertically, horizontally, diagonally, and/or the like. However, as will be recognized, the travel paths can be defined in various ways to adapt to different needs and circumstances. For example, the travel paths may be defined a configurable distance from one another. For instance, the travel paths may be defined every 25, 50, 75, or 100 feet vertically, horizontally, diagonally, and/or the like. This configurable distance can be adjusted as desired. The travel paths can be defined to extend through one another or stop at intersecting points in the parking area. As will be recognized, the parking area travel paths can also be defined in any concentration, shape, size, and/or design.

4. Known Obstructions

In one embodiment, after defining travel paths in the parking area, the mapping system 110 can identify known obstructions in the parking area (Block 515 of FIG. 5). Such obstructions may be buildings, medians, flowerbeds, trees, ornamental structures, sidewalks, playgrounds, storage areas, signs, barricades, shopping cart returns areas, light posts, and/or any other things that may prevent passage through or parking at the obstruction. In the parking area identified in FIGS. 6-8 and 10-14, there are only two obstructions known to the mapping system 110—the buildings for the serviceable addresses 600.

As with the street network connection points 605, the mapping system 110 can identify known obstructions using a variety of techniques and approaches. In one embodiment, identifying a known obstruction in a parking area may include identifying records corresponding to the serviceable address 600 and retrieving the corresponding point information for the same, such as the freight delivery points, the package delivery points, the letter delivery points, the access points, the front door points, the back door points, the side door points, and/or the like, which may be part of one or more map layers of a digital map.

In another embodiment, a user can operate a mouse or other input device to manually draw a polygon around known obstructions to identify the known obstructions as such to the mapping system 110. In another embodiment, known obstructions can be identified based on telematics data collected while traversing the parking area. And in yet another embodiment, the mapping system 110 can identify/determine such obstructions from imagery of the parking area captured by satellites, by manned or unmanned aircraft, and/or by vehicles 100 traversing the parking area or by personnel traversing the parking area (collected manually or in response to various triggers). In another embodiment, the mapping system 110 can also identify/determine such obstructions from surveys, building boundaries, and/or the like. In certain embodiments, the physical dimensions of the known obstructions can also be determined, accessed, and/or obtained.

After identifying known obstructions, the mapping system 110 can remove travel paths defined in the parking area that overlap with the known obstructions (Block 520 of FIG. 5). For example, for each known obstruction, the mapping system 110 can remove known travel paths that overlap with the known obstruction. For instance, for the serviceable addresses shown in FIGS. 6-8 and 10-14, the mapping system 110 can remove all travel paths that have been defined and overlap with the freight delivery points, package delivery points, letter delivery points, access points, front door points, back door points, side door points, dimensions of building structures or other obstructions, and/or the like. That is, the mapping system 110 can remove all travel paths that have been defined and that overlap with such obstructions.

Figure 12:
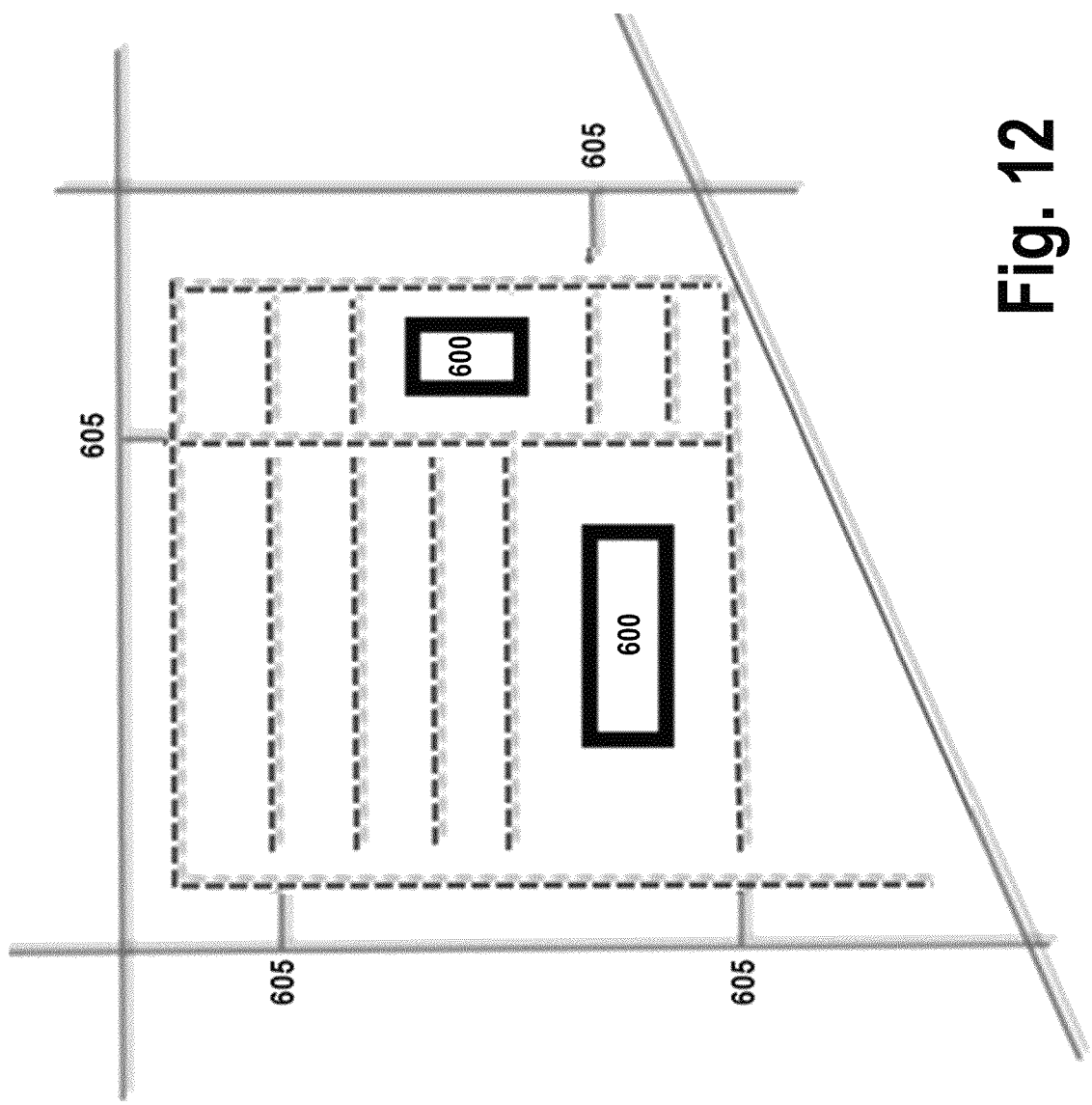

Additionally or alternatively, the mapping system 110 can remove all defined travel paths that are within a configurable distance from known obstructions. For example, for each known obstruction, the mapping system 110 can remove defined travel paths that are within a configurable distance of known obstructions. For instance, for the serviceable addresses shown in FIGS. 6-8 and 10-14, the mapping system 110 can remove all travel paths that are within 25, 50, 75, and/or 100 feet of the known obstructions. Such distances can be adapted to conform to a variety needs and circumstances. FIG. 12 shows an embodiment in which some of the travel paths defined in FIG. 11 are removed because of known obstructions.

As will also recognized, the known obstructions can be identified before defining the travel paths so that no travel paths are defined that would overlap with or are not sufficiently offset from the known obstructions. In such an embodiment, the steps of Blocks 515 and 510 could be performed in reverse and Block 520 could be eliminated. As will be recognized, though, a variety of other approaches and techniques can be used to adapt to various needs and circumstances.

In one embodiment, after defining the travel paths in the parking area and removing any defined travel paths as described above, the mapping system 110 can update digital maps to represent the travel paths defined in the parking area. In another embodiment, the mapping system 110 can further process the travel paths by merging the defined travel paths with collected telematics data.

5. Merging Defined Parking Paths with Collected Telematics Data

Figure 13:
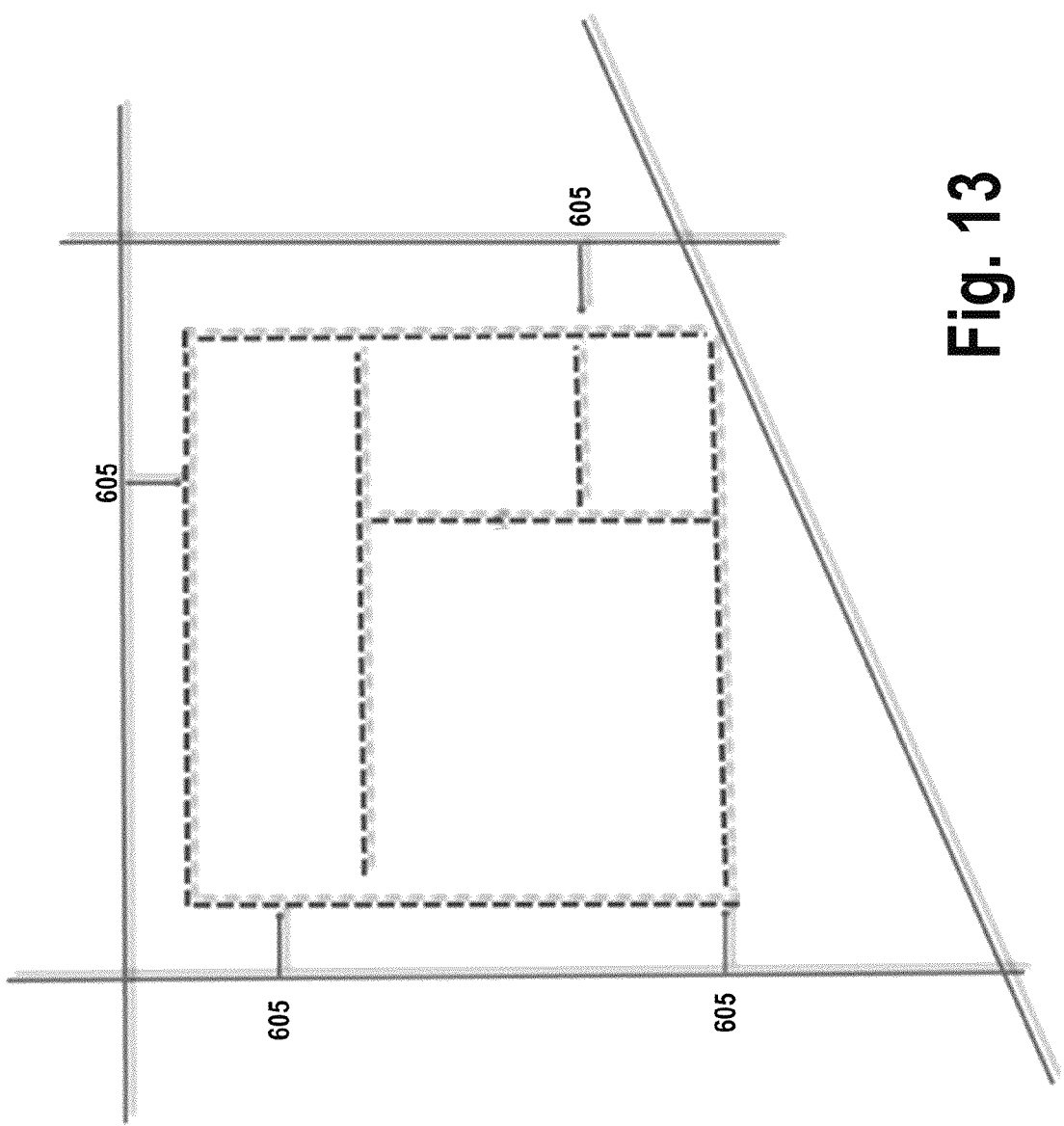

In addition to defining travel paths in parking areas, the mapping system 110 can use the telematics data (including location data comprising geo coordinate samples) to plot/identify one or more actual travel paths of vehicle 100 on a digital map. To do so, the mapping system 110 may load and display a base map. For example, in various embodiments, the data comprising the base map may be stored on, and retrieved from, a variety of computing entities. Then, the mapping system 110 can review telematics data (including location data comprising geo coordinate samples) that has been collected to generate/provide a graphical representation of the one or more travel paths of vehicles 100 in a parking area. In one embodiment, the mapping system 110 can accomplish this by plotting/identifying each individual location data point from the collected telematics data on the map display and then connecting the plotted/identified location points in chronological order with lines displayed over the base map. In various embodiments the travel paths generated by the mapping system 110 may comprise a line with various distinguishing characteristics, such as color and thickness variations. FIG. 13 shows the travel paths plotted/identified by the mapping system 110 as determined from the telematics data collected by one or more vehicles 100 over a period of time.

In one embodiment, the travel paths that are plotted/identified based on the collected telematics data (including location data comprising geo coordinate samples) can be merged/combined with the travel paths defined by connecting the one or more street network connection points 605 in the parking area. For instance, the travel paths shown as being defined in FIG. 12 (first set of travel paths) can be merged/combined with the travel paths shown in FIG. 13 (second set of travel paths). In one embodiment, in combining/merging the two sets of travel paths, the mapping system 110 may retain all the travel paths represented from both sets. In another embodiment, the mapping system 110 can give precedence to one of the sets of travel paths, such as the travel paths identified/determined from the collected telematics data since a vehicle 100 actually traversed those points. FIG. 14 represents the parking area after merging/combing the two sets of travel paths. As can be seen from this figure, the mapping system 110 removed some of the travel paths defined by connecting the street network connection points 605. As will be recognized, a variety of other approaches and techniques can also be used to adapt to various need and circumstances.

In one embodiment, the mapping system 110 can update maps to represent the travel paths of parking areas that have been defined, identified/determined, and/or merged/combined. For example, the mapping system 110 can update the parking areas in maps to include the various travel paths that have been defined or identified/determined. This may include updating the one or more map layers to accurately reflect the travel paths in parking areas.

e. Optimizing Routes and/or Providing Directions

In one embodiment, with the travel areas of parking areas being stored as part of a digital map, the mapping system 110 can better determine or provide information about traveling to or accessing serviceable addresses 600 within or accessible by parking areas. In that regard, delivery route and/or directions, for example, using a set of serviceable addresses 600 can be optimized to take into account travel within parking areas, traversing parking areas from one serviceable address to another, and/or the like. This may include creating time and distance matrices and or a variety of other approaches and techniques to adapt to various needs and circumstances.

In one embodiment, such routing may include providing directions and/or routing information (including travel paths in parking areas) for routing to front doors, back doors, side doors, and/or any other point stored in the corresponding records. Such routing may be based on vehicle type. For example, all passenger vehicles 100 may be routed to the front door of serviceable addresses 600, while commercial vehicles 100 may be routed to back or side doors of serviceable addresses 600. The vehicle type may be input received from a user or be automatically detected or provided based on telematics data. As will be recognized, a variety of other approaches and techniques can be used to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for defining travel paths in parking areas, the method comprising:
   identifying, by one or more processors, one or more street network connection points for a parking area, the one or more street network connection points providing the ability to enter the parking area from a street network, exit the parking area to the street network, or both;
   defining, by the one or more processors, a first set of one or more travel paths in the parking area by connecting the one or more street network connection points in the parking area;
   defining, by the one or more processors, a second set of one or more travel paths in the parking area by identifying one or more paths traversed by one or more vehicles in the parking area based at least in part on telematics data collected while the one or more vehicle were traversing the parking area; and
   merging, by the one or more processors, the first set of one or more travel paths with the second set of one or more travel paths.

2. The method of claim 1 further comprising:
   identifying a known obstruction in the parking area; and
   removing travel paths defined in the parking area that overlap with the known obstruction.

3. The method of claim 2, wherein removing the travel paths defined in the parking area that overlap with the known obstruction further comprises removing travel paths defined in the parking area that are within a configurable distance of the known obstruction.

4. The method of claim 3 further comprising representing the travel paths defined in the parking area in the digital map.

5. The method of claim 1, wherein defining the first set of travel paths in the parking area by connecting the one or more street network connection points in the parking area further comprises defining travel paths in the parking area using one selected from the group consisting of a grid, a lattice, and a matrix.

6. The method of claim 5, wherein each of the first set of travel paths of the grid, lattice, or matrix is defined at a configurable distance from one another.

7. A computer program product for defining travel paths in parking areas, the computer program product comprising at least one non-transitory computer-readable storage medium having computer-readable program code portions stored therein, the computer-readable program code portions comprising:
   an executable portion configured to identify one or more street network connection points for a parking area, the one or more street network connection points providing the ability to enter the parking area from a street network, exit the parking area to the street network, or both;
   an executable portion configured to define a first set of one or more travel paths in the parking area by connecting the one or more street network connection points in the parking area;
   an executable portion configured to define a second set of one or more travel paths in the parking area by identifying one or more paths traversed by one or more vehicles in the parking area based at least in part on telematics data collected while the one or more vehicle were traversing the parking area; and
   an executable portion configured to merge the first set of one or more travel paths with the second set of one or more travel paths.

8. The computer program product of claim 7 further comprising:
   an executable portion configured to identify a known obstruction in the parking area; and
   an executable portion configured to remove travel paths defined in the parking area that overlap with the known obstruction.

9. The computer program product of claim 8, wherein removing the travel paths defined in the parking area that overlap with the known obstruction further comprises removing travel paths defined in the parking area that are within a configurable distance of the known obstruction.

10. The computer program product of claim 9 further comprising an executable portion configured to represent the travel paths defined in the parking area in the digital map.

11. The computer program product of claim 7, wherein defining the first set of travel paths in the parking area by connecting the one or more street network connection points in the parking area further comprises defining travel paths in the parking area using one selected from the group consisting of a grid, a lattice, and a matrix.

12. The computer program product of claim 11, wherein each of the first set of travel paths of the grid, lattice, or matrix is defined at a configurable distance from one another.

13. An apparatus comprising at least one processor and at least one memory including computer program code, the at least one memory and the computer program code configured to, with the processor, cause the apparatus to at least:
   identify one or more street network connection points for a parking area, the one or more street network connection points providing the ability to enter the parking area from a street network, exit the parking area to the street network, or both;

define a first set of one or more travel paths in the parking area by connecting the one or more street network connection points in the parking area;

define a second set of one or more travel paths in the parking area by identifying one or more paths traversed by one or more vehicles in the parking area based at least in part on telematics data collected while the one or more vehicle were traversing the parking area; and merge the first set of one or more travel paths with the second set of one or more travel paths.

14. The apparatus of claim 13, wherein the memory and computer program code are further configured to, with the processor, cause the apparatus to:

identify a known obstruction in the parking area; and remove travel paths defined in the parking area that overlap with the known obstruction.

15. The apparatus of claim 14, wherein removing the travel paths defined in the parking area that overlap with the known obstruction further comprises removing travel paths defined in the parking area that are within a configurable distance of the known obstruction.

16. The apparatus of claim 15, wherein the memory and computer program code are further configured to, with the processor, cause the apparatus to represent the travel paths defined in the parking area in the digital map.

17. The apparatus of claim 13, wherein defining the first set of travel paths in the parking area by connecting the one or more street network connection points in the parking area further comprises defining travel paths in the parking area using one selected from the group consisting of a grid, a lattice, and a matrix.

18. The apparatus of claim 17, wherein each of the first set of travel paths of the grid, lattice, or matrix is defined at a configurable distance from one another.

* * * * *